United States Patent
Müller et al.

(10) Patent No.: US 7,422,397 B2
(45) Date of Patent: Sep. 9, 2008

(54) BEVEL GEAR CUTTING MACHINE FOR CHAMFERING AND/OR DEBURRING EDGES ON THE TEETH OF A BEVEL GEAR

(75) Inventors: Harmuth Müller, Remscheid (DE); Karl-Martin Ribbeck, Remscheid (DE)

(73) Assignee: Klingelnberg GmbH, Hückeswagen (DE)

(*) Notice: Subject to any disclaimer, the term of this patent is extended or adjusted under 35 U.S.C. 154(b) by 561 days.

(21) Appl. No.: 11/083,616

(22) Filed: Mar. 18, 2005

(65) Prior Publication Data

US 2005/0207858 A1    Sep. 22, 2005

(30) Foreign Application Priority Data

Mar. 19, 2004    (DE) .................. 20 2004 004 480 U

(51) Int. Cl.
    *B23F 19/10*    (2006.01)
(52) U.S. Cl. ................. 409/8; 409/26; 409/27
(58) Field of Classification Search .......... 409/8, 409/25–29, 51; *B23F 19/10*
    See application file for complete search history.

(56) References Cited

U.S. PATENT DOCUMENTS

| 2,772,602 | A | * | 12/1956 | Christman | ............. | 409/8 |
| 5,961,260 | A |   | 10/1999 | Kasler et al. | | |

FOREIGN PATENT DOCUMENTS

| DE | 11 85 039 A | 1/1965 |
| DE | 43 19 326 A1 | 12/1994 |
| DE | 196 46 189 A1 | 5/1998 |
| DE | 197 444 86 A1 | 4/1999 |
| DE | 199 00 423 A1 | 8/1999 |
| DE | 201 03 328 U1 | 6/2001 |
| JP | 02292121 A | * | 12/1990 |
| JP | 07024635 |   | 1/1995 |
| JP | 101 80 542 |   | 7/1998 |
| JP | 2002046030 A | * | 2/2002 |
| JP | 2003251527 A | * | 9/2003 |

OTHER PUBLICATIONS

European Search Report, Dated Aug. 2, 2005.

\* cited by examiner

*Primary Examiner*—Daniel W Howell
(74) *Attorney, Agent, or Firm*—McCormick, Paulding & Huber LLP

(57) ABSTRACT

A bevel gear cutting machine, which is designed for, among other things, chamfering and/or deburring edges on the teeth of a bevel gear. The gear cutting machine has a workpiece spindle which receives the bevel gear coaxially. A carriage is provided, which receives a plate-shaped cutter head having multiple bar blades. The gear cutting machine has multiple numerically controllable axes, which are activatable via a programmable controller, one of the axes forming a workpiece spindle axis of the workpiece spindle. Another axis is used as the tool spindle axis of the plate-shaped cutter head. The numerically controllable axes are implemented and positioned so that by adjusting at least one of the axes, the workpiece spindle, together with the bevel gear, may be inclined in relation to the cutter head in such a way that the bar blades, while the workpiece spindle rotates around the workpiece spindle axis and the cutter head rotates around the tool spindle axis simultaneously, plunge one after another into tooth intermediate spaces of neighboring teeth and execute a chamfering or deburring motion in relation to the edge.

11 Claims, 2 Drawing Sheets

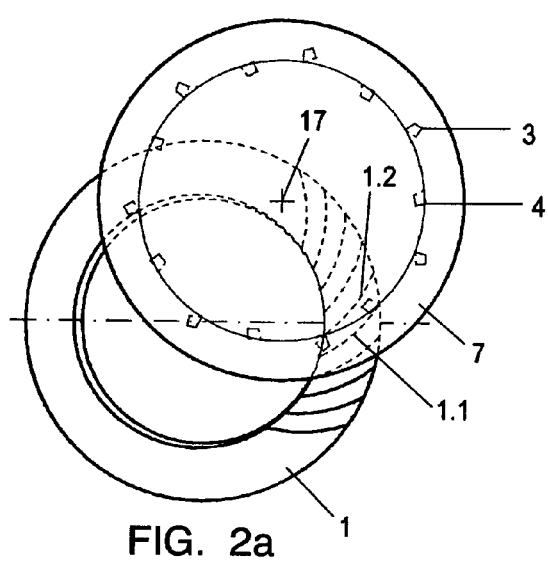
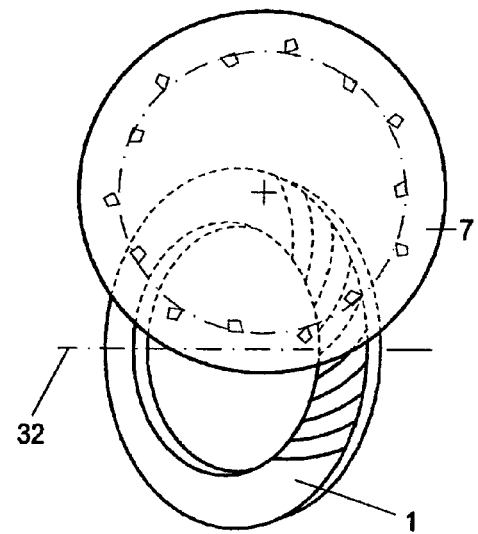
FIG. 2a
FIG. 3a
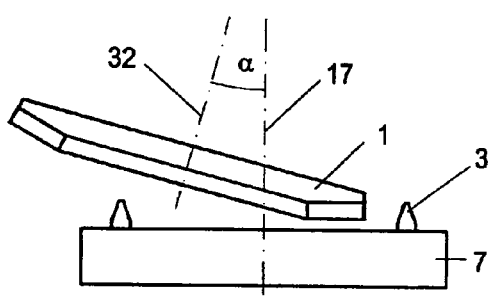
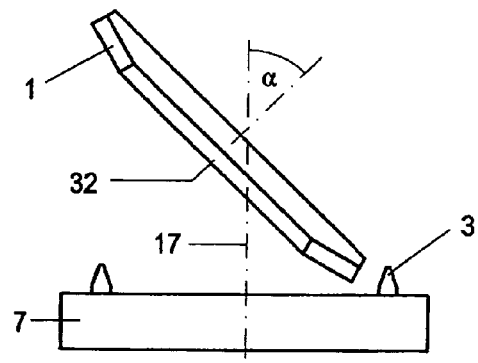
FIG. 2b
FIG. 3b

BEVEL GEAR CUTTING MACHINE FOR CHAMFERING AND/OR DEBURRING EDGES ON THE TEETH OF A BEVEL GEAR

CROSS REFERENCE TO PRIOR APPLICATION

Applicants hereby claim foreign priority under 35 U.S.C. § 119 from German Patent Application DE 20 2004 004 480.3 filed Mar. 19, 2004, the disclosure of which is herein incorporated by reference.

The present invention relates to gear cutting machines and the deburring and/or chamfering of the tooth edges of bevel gears.

BACKGROUND OF THE INVENTION

When manufacturing spiral-toothed bevel gears, the tooth gaps are predominantly machined out from the small to the large diameter of the gear body using a cutter head. A burr arises at the outer tooth end in this case through the machining, predominantly on the concave flank, because this flank typically forms an acute angle with the rear face of the bevel gear tooth. If one merely removed the burr at this point, a very sharp profiled edge would remain. Because of the great danger of injury, but also because of harmful deformations when hardening the bevel gears, these edges are frequently broken by a chamfer. If this angle is not so acute, because the bevel gear has a small spiral angle, for example, it is sufficient to deburr the edge.

Devices which were developed for conventional mechanical bevel gear cutting machines are known for this chamfering and/or deburring of bevel gears. Even during the milling of the bevel gears in the discontinuous dividing method, the tooth ends are deburred after each tooth gap. Or in the continuous method, the chamfering and/or deburring is performed after the gear cutting in a separate work cycle.

Separately standing deburring devices are also frequently used. In these devices, the disadvantage of additional workpiece clamping is accepted in order to have more space available in proximity to the workpiece than in a gear cutting machine, because then the deburring tools may be set more flexibly and easily to the particular workpiece dimensions. In addition, more bevel gears may be cut on a gear cutting machine in the same time if they do not also have to be deburred there.

A deburring device of this type, in which two different milling cutters are used for deburring, each of which has its own rotary drive, is described in DE 197 44 486 A1. The cutters are positioned on a shared support and operate with the bevel gear at a standstill using one single radial feed motion. It is disadvantageous in this case that the milling cutters must be aligned to one another and each milling cutter requires a special profiled shape for its cutting edges, which must be tailored to the particular bevel gear to be deburred.

Another separate chamfering device for bevel gears, which operates using a rotationally driven end-milling cutter, originates from DE 298 01 318 U1. In this case, the cutter spindle is movable in 3 axes, specifically horizontally, vertically, and in a pivot, in relation to the workpiece carrier, which is controllable around its axis, and a controller is provided for coupling the four axial motions, through which the end-milling cutter is guided along a programmed path. In addition to the disadvantages which are connected with a separate deburring device, in this device, in spite of the great mechanical engineering complexity, the outer tooth ends of slender shaft pinions cannot be chamfered.

In a known deburring device which is used directly on a gear cutting machine, a multipass fly-milling cutter is used, whose axis of rotation is set so that the cutting edge of the fly cutter moves along the profiled edge of a bevel gear tooth to be chamfered. This device operates not in the indexing method, but rather with constant workpiece rotation, so that each following fly cutter engages in the next bevel gear gap in sequence. The decisive disadvantage, however, is that not all bevel gears may be deburred on their gear cutting machine using a fly-milling cutter. A further disadvantage is that special fly-milling cutters must be used. In addition, space for a fly-milling cutter must be provided in the machine.

A gear cutting machine, in which a tool referred to as a planing tool, which is attached to a pneumatically-operated piston, is used, is described in German Published Application 11 85 039 A. An essential disadvantage of this known device is that the planing tool may machine each tooth end with a cut whose direction may be set, but is then linear per se. The profiled edge to be deburred is a spatially strongly curved curve, however, which results from the intersection of two faces, specifically the bevel gear flank having adjoining foot rounding, which is curved anyway, and the rear face of the bevel gear tooth. The latter is typically a bevel face which may be additionally set back and/or rounded at the tooth end once again. This means that the profiled edge may not be chamfered correctly using the known device. At most an averaging direction may be set, and the device must then plane away a significant quantity of material in order to deburr the complete tooth height. Secondary burrs may form easily in this case, which is just as undesirable. In addition, it is hardly possible to avoid a sharp notch arising in the foot rounding, due to the shaping tool, which impairs the load capacity of the bevel pinion. A further disadvantage is the complexity with which a linear shaping device must be set manually to the particular workpiece dimensions.

Similar disadvantages also related to the deburring device operating in one axis according to the Japanese publication JP 10-180542 A, which is also used in a gear cutting machine. In this case, the shaping tool comprises an angle lever, which is mounted so it is rotatable at its vertex. Its short leg is implemented to form a straight cutting edge, while a pneumatically-operated piston again engages on the longer leg. The holder for the angle lever and the piston must be aligned precisely as in the device according to DE 11 85 039 A, so that the cutting edge, which is guided on a circular arc, moves in an averaging direction along the profiled edge of the stationary bevel gear. This device is also not usable for deburring bevel gears and particularly bevel pinions. In addition, it is a disadvantage that a special shaping tool is necessary.

Therefore, the present invention is based on the object of designing a bevel gear cutting machine in such a way that, using little complex apparatus, greatly varying types of bevel gears may be chamfered and/or deburred, as well as providing a corresponding method.

A further object of the present invention is to design a bevel gear cutting machine in such a way that the longer dwell time of the workpiece in the gear cutting machine caused by the deburring is relatively short.

SUMMARY OF THE INVENTION

This object is achieved according to the present invention in that a bevel gear cutting machine is provided which is designed for, among other things, chamfering and/or deburring edges on the teeth of a bevel gear. The gear cutting machine has a workpiece spindle which receives the bevel gear coaxially. A carriage is provided, which receives a plate-shaped cutter head having multiple bar blades. The gear cutting machine has a total of five numerically controllable axes, which are activatable via a programmable controller, one of the axes forming a workpiece spindle axis of the workpiece spindle. Another axis serves as the tool spindle axis of the plate-shaped cutter head. The numerically controllable axes are implemented and positioned so that by adjusting at least one of the axes, the workpiece spindle, together with the bevel gear, may be inclined in relation to the cutter head in such a way that the bar blades, while the workpiece spindle rotates around the workpiece spindle axis and the cutter head rotates around the tool spindle axis simultaneously, may plunge one after another into tooth intermediate spaces of neighboring teeth and execute a chamfering or deburring motion in relation to the edge.

The objects are achieved according to the present invention by a gear cutting machine which has at least five numerical controlled axes of motion. The axes are controlled so that the work piece spindle and bevel gear bar blades of the head plunge one after the other into the spaces between neighboring teeth and execute a chamfering or deburring motion in relation to the edge of a gear tooth using the cutter head. Advantageous embodiments of the gear cutting machine according to the present invention are also described below.

The essential advantages of the present invention are that, via the six axes (NC axes) which are numerically controllable using a programmable controller, nearly any arbitrarily shaped profiled edges of bevel gears are achievable using the cutting edges of the bar blades. Therefore, in spite of a curved profiled edge, a chamfer may be generated and/or deburring may be performed. Secondary burrs may be avoided, since with an appropriately steep inclination of the bar blade in relation to the bevel gear, large quantities of material do not have to be planed off in order to deburr the complete tooth height.

It is also advantageous that the chamfering or deburring is performed in a continuous process according to the present invention, which leads to significantly shorter machining times than in discontinuous processes.

Until now, the use of separate NC axes for the cutting motion of a deburring device was considered not to be cost-effective in comparison to purely mechanical or pneumatically-operated deburring solutions. It is a special advantage of the device according to the present invention that no additional NC axes must be provided, but rather the numerically controllable axes already existing are used for deburring. It is a further advantage of the present invention that no special deburring tools, which must be mounted and handled specially, must be used. In addition, the time-consuming retooling, which leads to operational errors, is dispensed with according to the present invention. Therefore, no notable time losses arise for deburring on the gear cutting machine. In addition, no special capture or suction device is necessary for the chips arising when deburring or chamfering, depending on the embodiment.

Gear cutting machines as are used in numerous industrial and manufacturing operations may advantageously be modified according to the present invention.

BRIEF DESCRIPTION OF THE DRAWINGS

Exemplary embodiments of the present invention will be described in the following with reference to the drawings.

FIGS. 2a & b show a schematic top view and side view of the machining region of the gear cutting machine during gear cutting;

FIGS. 3a & b show a schematic top view and side view of the machining region of the gear cutting machine during deburring or chamfering.

DESCRIPTION OF THE PREFERRED EMBODIMENTS

Figure 1:
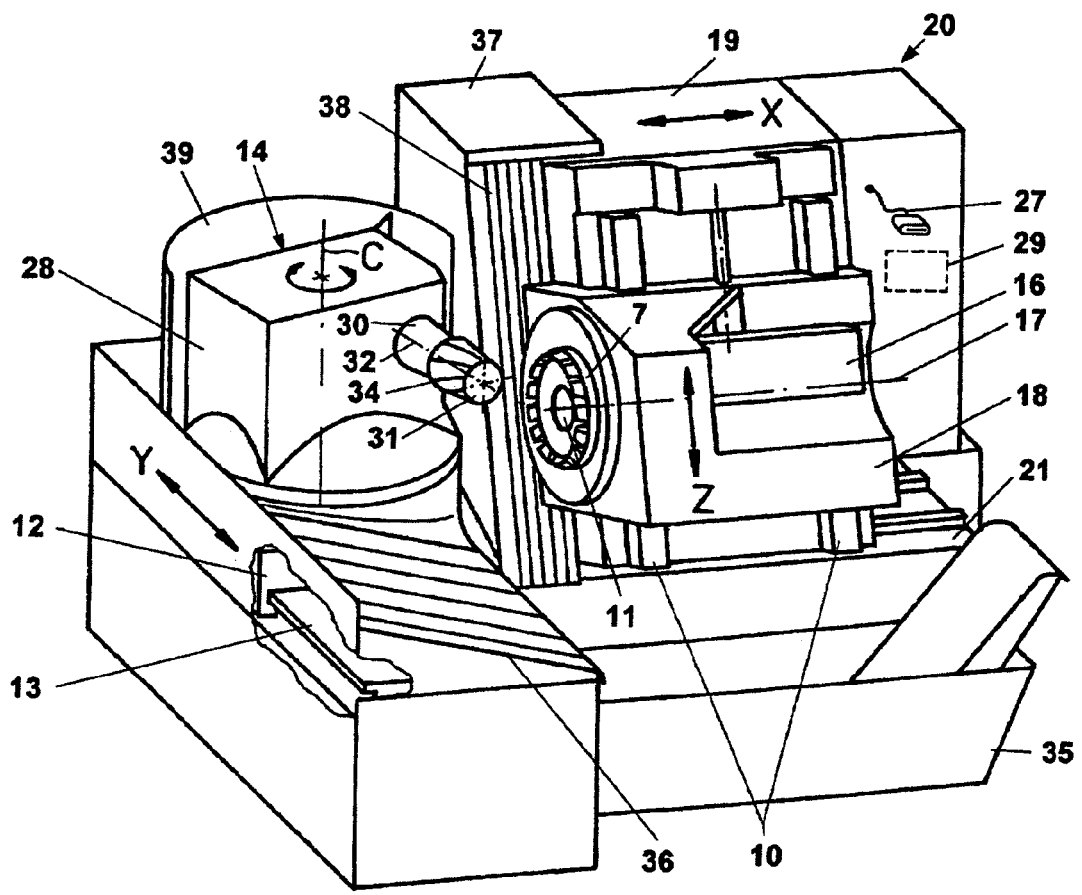
FIG. 1 shows a perspective view of a gear cutting machine according to the present invention.

A possible embodiment of the present invention will be described in connection with FIGS. 1, 2, and 3. A bevel gear pinion is machined in FIG. 1, while in contrast a ring gear is machined in FIGS. 2 and 3.

FIG. 1 shows a perspective illustration of the basic construction of a CNC machine 20 for manufacturing spiral-toothed bevel gears 31. Such a machine 20 may be designed or retooled according to the present invention in order to allow deburring or chamfering of the bevel gear 31 using the same bar blades which are also used when manufacturing the teeth of the bevel gear 31.

The CNC machine 20 may be constructed as follows. A machine housing 19 is guided horizontally and linearly along a linear coordinate axis X (first axis) on a machine bed 21. A first carriage 18 may travel in height on a guide 10, which is attached to a side face of the machine housing 19, along a linear coordinate axis Z (second axis) using a spindle drive 16. A workpiece spindle support 14 having a second carriage 12 is horizontally and linearly guided on a guide 13 along a linear coordinate axis Y (third axis), which is perpendicular to the X axis, on the machine bed 21. A pivot device 28 having a vertical axis C (fourth axis) is located on the carriage 12. The guide 10 of the first carriage 18 and the Z axis are inclined to the vertical.

The first carriage 18 carries a tool spindle 11, which is mounted so it is rotatable around a spindle axis 17 (fifth axis). The tool spindle 11 carries a tool, in this case a cutter head 7 having multiple bar blades, for example. A workpiece spindle 30 is horizontally guided and linearly displaceable and/or pivotable on the machine bed 21 by the second carriage 12 and by the pivot device 28. The pivot device 28 carries the workpiece spindle 30, which is rotatable around a workpiece spindle axis 32 (sixth axis). The workpiece spindle 30 carries a workpiece 31, a spiral-toothed bevel pinion gear in the present example. The pivot device 28 is pivotable horizontally guided around the C axis, in order to pivot the workpiece 31 into a machining position and, if necessary, be able to perform motions during the chamfering and/or deburring according to the present invention.

In total, the machine 20 thus has six numerically controlled axes. In order to be able to implement the deburring according to the present invention, machines having at least five numerically controlled axes are preferred.

However, other CNC gear cutting machines may also be retooled or equipped according to the present invention, machines having six numerically controlled axes being preferred. There is also the possibility of employing machines having 2 cutter heads, which are used for roughing-finishing gear milling, and using one of the two cutter heads for deburring in this case.

The machine bed 21 is advantageously recessed below the first carriage 18 and a chip collector 35 is positioned here, into which chips that arise during chamfering and/or deburring fall essentially through gravity.

The upper region of the second carriage 12, which is not occupied by the pivot device 28, preferably has a cover 36 that is aligned sloping down toward the chip collector 35. Further-more, the machine 20 has a covering 37, which is permanently connected to the machine bed 21 and is positioned between the machine housing 19 and the second carriage 12. The covering 37 is connected to the machine housing 19 by a folded bellows 38. The covering 37 and the folded bellows 38 are also aligned sloping down toward the chip collector 35. A shield 39, which encloses the pivot device 28 in a semicircle and is attached to the second carriage 12, adjoins the covering 37.

Details on the technique of bevel gear milling using a 6-axis machine may be inferred, for example, from U.S. patent application Ser. No. 5,961,260.

An indicated CNC controller 29 ensures that the six numerically controlled axes perform the motions required for deburring or chamfering after the gear cutting process is finished. In order to allow deburring or chamfering, the relative inclination between the plate-shaped cutter head 7 and the front face of the bevel gear 1 is increased, as may be inferred from FIGS. 2 and 3. The top view of a plate-shaped cutter head 7 having multiple bar blades 3 and 4 is shown in FIG. 2a. The bar blades 3, 4 are only indicated in FIG. 2a, since they are located on the side of the cutter head 7 facing toward the workpiece 1. The bar blades 3 and 4 are positioned alternately on the cutter head, the bar blade 3 machining the convex flank 1.1 of a tooth and the bar blade 4 machining the concave flank 1.2 of a tooth, for example. A schematic side view is shown in FIG. 2b. It may be seen in this side view that the bar blades 3, 4 are inserted into the cutter head 7 and, due to the slight relative inclination between the cutter head 7 and a radial section of the bevel gear 1 on the right side, plunge into the tooth gaps and implement the convex and concave tooth flanks there. The installation positions of the cutter head 7 and the bevel gear 1 in the gear cutting machine 20 may be recognized on the basis of the workpiece spindle axis 32 and the tool spindle axis 17. The projection of the workpiece spindle axis 32 on the tool spindle axis 17 typically encloses an angle $\alpha$ between 0 and 70°, as indicated in FIG. 2.

For deburring or chamfering, the relative position of the workpiece spindle axis 32 to the tool spindle axis 17 is changed, as shown in FIG. 3. At the same time, a larger angle $\alpha$ is set, which preferably deviates by an angular differential between 10 and 60° from the angle which was used when milling the same bevel gear. The top view of a plate-shaped cutter head 7 having multiple bar blades 3 and 4, which are used for deburring, is shown in FIG. 3a. The bar blades 3 and 4 plunge one after another into sequential tooth gaps, as shown in FIG. 3b, only an end region of the tooth gaps being brushed over due to the extreme diagonal attitude (inclination). For this purpose, according to a first embodiment, the inclination is set and the axes are moved so that only the concave tooth flanks are deburred, since, as described at the beginning, these flanks typically form an acute angle with the rear face of the bevel gear tooth. In this case, only those bar blades which were used for manufacturing the concave flanks perform a cut. Every second bar blade is skipped during deburring in this embodiment, i.e., no contact occurs between it and the tooth flank.

In a further embodiment, the machine settings may be selected so that the bar blade 3 removes any burrs on a convex flank and the bar blade 4 removes any burrs on a concave flank.

The workpiece spindle 30 and the tool spindle 11 are preferably positioned so that during gear cutting and deburring or chamfering, the workpiece 31 and the tool 7 are essentially located over the region of the machine 20 where the resulting chips may be captured without problems. If a machine as shown in FIG. 1 is used, it is to be noted that the chips which arise during chamfering or deburring drop into the chip collector 35 essentially through gravity.

According to the present invention, the same tool 7 which was also already used for the machining of the workpiece 31 is used for the chamfering and/or deburring. In order to allow the chamfering or deburring, the workpiece spindle 30, together with the bevel gear 31, is inclined strongly in relation to the cutter head by adjusting at least one of the axes of the machine 20, as shown in FIG. 3. With simultaneous coordinated rotation of the workpiece spindle 30 around the workpiece spindle axis 32 and the cutter head 7 around the tool spindle axis 17, the bar blades 3, 4 of the cutter head 7 engage one after another in tooth intermediate spaces of neighboring teeth and execute a chamfering or deburring motion in relation to the edges of the bevel gear 31 there. In order to allow coordinated rotation of the workpiece spindle 30 and the cutter head 7, at least these two rotational motions are coupled by the controller 29.

In the simplest case, a rotational motion around the vertical C axis is sufficient, as may be illustrated on the basis of the machine 20 in FIG. 1. The inclination between bevel gear 31 and cutter head 7 may be adjusted through a rotation of the workpiece spindle carrier 14 around the C axis. If rotational motions of the bevel gear 31 around the workpiece spindle axis 32 and of the cutter head 7 around the tool spindle axis 17 are then executed at suitable rotational velocities, the deburring according to the present invention is performed.

For more complicated geometrical shapes of the bevel gear, other axes must also be adjusted. The axes must possibly be adjusted dynamically in order to ensure that the bar blades only come into contact and become active in the end region of the teeth to be deburred. A part of the axial motions or all motions of the six numerically controlled axes are preferably coupled using the controller 29.

In a further embodiment, the deburring is performed in a first pass. During deburring, the relative inclination of the cutter head 7 to the workpiece 1 is set so that the bar blades only remove burrs which project from the tooth edges. In a further pass, a chamfer is then generated. For this purpose, the programmable controller 29 controls the axes so that the bar blades machine the tooth edges which were previously deburred at the desired angle. Secondary burrs may be avoided in this case, since with appropriately steep inclination of the bar blades in relation to the bevel gear, large quantities of material do not have to be machined off in order to deburr the complete tooth height.

It is an advantage of the present invention that the bar blades do not require any special profiled shape of the cutting edge in order to be able to be used for deburring or chamfering according to the present invention. Therefore, new tools do not have to be mounted, nor does the workpiece to be deburred have to be transferred into another machine before the chamfering or deburring. According to the present invention, the same workpiece chuck may be used for machining and chamfering or deburring. Enormous savings in time thus result.

It is also considered an advantage of the present invention that a relative position of the tool and the workpiece which allows chamfering or deburring may be set through relatively small and short motions. The transition from manufacturing the workpiece to the chamfering or deburring may thus be executed relatively rapidly.

The profiled edge to be deburred is, in bevel gears having spiral teeth, a spatially strongly curved curve that results from the intersection of two faces, specifically the flank, which is already curved anyway, having adjoining foot rounding, and the rear face of the bevel gear tooth. Such a profiled edge having a strongly curved curve may advantageously be chamfered or deburred using a device according to the present invention, since the six axes of the machine may be controlled so that the cutting edges of the bar blades may move freely to the profiled edge within certain limits.

The gear cutting machine is preferably designed as shown in FIG. 1. Such an arrangement of the six axes makes it possible for the region in which the engagement point of workpiece 31 and tool 7 is located to be large enough to allow strong inclination of the bevel gear 31 in relation to the plate-shaped tool 7, without obstructions or collisions occurring.

The gear cutting machine 20 is preferably equipped with a programmable controller 29, which allows the axes to be set so that deburring or chamfering may be performed.

In a preferred embodiment, the programmable controller is designed so that at least two of the six numerically controllable axes have their motions coupled. The coupling of five or even six of the numerically controlled axes is especially preferred.

In a further preferred embodiment, the programmable controller is designed so that it controls the motion sequence in such a way that the bar blades only plunge into the end region of the tooth intermediate spaces.

A cable, which is provided with the number 27, is indicated in FIG. 1. Instead of providing the controller 29 in the gear cutting machine 20, the entire controller or a part of the controller may be moved to an external location. In this case, control information would be transferred to the gear cutting machine 20 via the cable 27.

The present invention may be used especially advantageously in a CNC-controlled gear cutting machine according to U.S. Pat. No. 5,961,260.

What is claimed is:

1. A method for chamfering and/or deburring edges on the teeth of a bevel gear on a bevel gear cutting machine having at least five numerically controllable axes, in which the bevel gear is mounted so it is rotatable on a workpiece spindle having a workpiece spindle axis and a cutter head having multiple bar blades is mounted so it is rotatable around a tool spindle axis, wherein the method comprises the following steps, which are executed following gear cutting machining of the bevel gear:
adjusting the workpiece spindle axis and/or tool spindle axis in order to enlarge the relative inclination between the workpiece spindle and the cutter head, by setting a larger angle which deviates by an angular differential of between 10° to 60° from the angle which was used when milling the same bevel gear; and
executing a coordinated rotation of the workpiece spindle around the workpiece spindle axis and the cutter head around the tool spindle axis, in order to allow the bar blades of the cutter head to engage one after another in tooth intermediate spaces of neighboring teeth of the bevel gear and execute a chamfering or deburring motion in relation to edges of the bevel gear there;
wherein at least two of the at least five numerically controllable axes have their motions coupled in order to achieve the coordinated rotation; and
wherein the gear cutting machining of the bevel gear and the chamfering and/or deburring of edges are executed on the teeth of the bevel gear using the same cutter head.

2. The method according to claim 1, wherein:
the bar blades are positioned alternately on the cutter head, a first group of the bar blades being used for machining convex flanks of the teeth and a second, alternately positioned group of the bar blades being used for machining concave flanks of the teeth; and
only the concave flanks are deburred during execution of the coordinated rotation and, at the same time, only those bar blades which were used for manufacturing the concave flanks are employed for cutting.

3. The method according to claim 1, wherein:
the bar blades are positioned alternately on the cutter head, a first group of the bar blades being used for machining convex flanks of the teeth and a second, alternately positioned group of the bar blades being used for machining concave flanks of the teeth;
during execution of the coordinated rotation, the concave flanks are deburred by those bar blades which were used for manufacturing the concave flanks; and
during execution of the coordinated rotation, the convex flanks are deburred by those bar blades which were used for manufacturing the convex flanks.

4. The method according to claim 1, wherein:
more than two of the at least five numerically controllable axes are adjusted and this adjustment of the axes is performed dynamically in order to ensure that the bar blades only come into contact and become active in an end region of the teeth to be deburred and/or chamfered, whereby chamfering and/or deburring of bevel gears with complex geometrical shapes is facilitated and enhanced.

5. The method according to claim 1, wherein:
in a first step, the relative inclination between the workpiece spindle, together with the bevel gear, and the cutter head is set so that the bar blades only remove burrs which project from the tooth edges; and
in a second step, the axes are controlled so that a chamfer is generated by way of the bar blades machining the tooth edges which were deburred in the first step at a desired angle.

6. A method for chamfering and/or deburring edges on the teeth of a bevel gear on a bevel gear cutting machine having at least five numerically controllable axes, in which the bevel gear is mounted so it is rotatable on a workpiece spindle having a workpiece spindle axis and a cutter head having multiple bar blades is mounted so it is rotatable around a tool spindle axis, wherein the method comprises the following steps, which are executed following gear cutting machining of the bevel gear:
adjusting the workpiece spindle axis and/or tool spindle axis in order to enlarge the relative inclination between the workpiece spindle and the cutter head, by setting a larger angle which deviates by an angular differential from the angle which was used when milling the same bevel gear; and
executing a coordinated rotation of the workpiece spindle around the workpiece spindle axis and the cutter head around the tool spindle axis, in order to allow the bar blades of the cutter head to engage one after another in tooth intermediate spaces of neighboring teeth of the bevel gear and execute a chamfering or deburring motion in relation to edges of the bevel gear there;
wherein at least two of the at least five numerically controllable axes have their motions coupled in order to achieve the coordinated rotation; and
wherein the gear cutting machining of the bevel gear and the chamfering and/or deburring of edges are executed on the teeth of the bevel gear using the same cutter head.

7. The method according to claim 6, wherein the angular differential is between 10° and 60°.

8. The method according to claim 6, wherein:

the bar blades are positioned alternately on the cutter head, a first group of the bar blades being used for machining convex flanks of the teeth and a second, alternately positioned group of the bar blades being used for machining concave flanks of the teeth; and only the concave flanks are deburred during execution of the coordinated rotation and, at the same time, only those bar blades which were used for manufacturing the concave flanks are employed for cutting.

9. The method according to claim 6, wherein:

the bar blades are positioned alternately on the cutter head, a first group of the bar blades being used for machining convex flanks of the teeth and a second, alternately positioned group of the bar blades being used for machining concave flanks of the teeth;

during execution of the coordinated rotation, the concave flanks are deburred by those bar blades which were used for manufacturing the concave flanks; and during execution of the coordinated rotation, the convex flanks are deburred by those bar blades which were used for manufacturing the convex flanks.

10. The method according to claim 6, wherein:

more than two of the at least five numerically controllable axes are adjusted and this adjustment of the axes is performed dynamically in order to ensure that the bar blades only come into contact and become active in an end region of the teeth to be deburred and/or chamfered, whereby chamfering and/or deburring of bevel gears with complex geometrical shapes is facilitated and enhanced.

11. The method according to claim 6, wherein:

in a first step, the relative inclination between the workpiece spindle, together with the bevel gear, and the cutter head is set so that the bar blades only remove burrs which project from the tooth edges; and in a second step, the axes are controlled so that a chamfer is generated by way of the bar blades machining the tooth edges which were deburred in the first step at a desired angle.

* * * * *